United States Patent [19]
Procter

[11] 3,949,046
[45] Apr. 6, 1976

[54] METHOD OF MANUFACTURING PLASTIC CONTAINERS

[75] Inventor: Brian Procter, Stroud, England

[73] Assignee: Hayssen Manufacturing Company, Sheboygan, Wis.

[22] Filed: May 8, 1974

[21] Appl. No.: 468,072

[30] Foreign Application Priority Data
June 5, 1973 United Kingdom............... 26885/73

[52] U.S. Cl................. 264/296; 229/1.5 B; 264/92; 264/94; 425/388
[51] Int. Cl.²......................................... B29C 17/04
[58] Field of Search............ 264/89, 90, 92, 93, 94, 264/296, 248; 425/388, 503, 504, 387 R; 229/1.5 B

[56] References Cited
UNITED STATES PATENTS 3,214,797 11/1965 Ollier et al...................... 264/296 X
3,234,310 2/1966 Edwards.......................... 264/296 X Primary Examiner—Jan H. Silbaugh
Attorney, Agent, or Firm—Koenig, Senniger, Powers and Leavitt

[57] ABSTRACT

A method of making a one-piece plastic container having a body, a raised bottom and a flange integral with the bottom and the body joining the bottom edge of the body and the periphery of the raised bottom, the flange being sealed to the lower portion of the body which surrounds the flange. The container is initially molded with a bottom integral with its body at the bottom edge of the latter, and the bottom is displaced to a raised position relative to the bottom edge of the body with accompanying formation of the flange.

1 Claim, 4 Drawing Figures

METHOD OF MANUFACTURING PLASTIC CONTAINERS

BACKGROUND OF THE INVENTION

This invention relates to the manufacture of disposable containers or cups.

The term "cups" will be used throughout the specification, but the expression is intended to include other containers and hollow ware. The cups are principally intended for containing foodstuffs, for example, beverages and soups.

Known methods of producing disposable cups include the thermoforming of cups directly from a sheet or diaphragm of a plastics material and also the extrusion or injection of a parison of plastics material which is subsequently blow-molded to form the cup. such cups comprise a side wall, a base and an integral bottom wall projecting below and extending around the base of the cup. The bottom wall may be obtained by molding the cup with a side wall and a base, and raising the central portion of the base by means of a movable support piston, thus leaving a channel around the edge of the base, the walls of the channel forming a double bottom wall of the cup. As an alternative, the side wall and the base may be formed separately and welded together by a process of spin welding. A cup of this type is stronger at the base than the cup described at first, and also has no channel within the bottom wall in which space contamination may be lodged. However, the method of manufacture is considerably more complicated than the first-mentioned process.

SUMMARY OF THE INVENTION

It is an object of the invention to provide a method of producing a cup which is simpler than the second-mentioned process, but which produces a cup without the disadvantages of that produced by the first-mentioned process.

According to one aspect of the invention, there is provided a method of manufacture of a cup, comprising thermoforming or blow-molding a cup with an integral side wall and base, and raising the base relative to the side wall in such a way that material of the side wall is folded over and welded together into a bottom wall by friction, due to relative axial movement and the application of a radial compressive force.

Other objects and features will be in part apparent and in part pointed out hereinafter.

BRIEF DESCRIPTION OF THE DRAWINGS

For a better understanding of the invention and to show how the same may be carried into effect, reference will now be directed, by way of example, to the accompanying drawings, in which.

Corresponding reference characters indicate corresponding parts throughout the several views of the drawings.

DESCRIPTION OF THE PREFERRED EMBODIMENT

Figure 1:
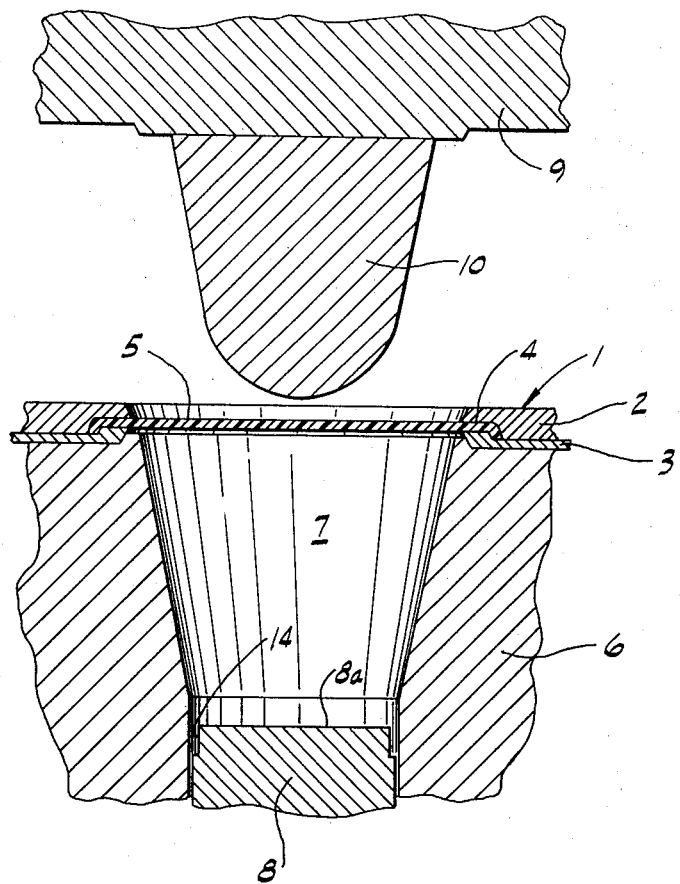
FIG. 1 is a sectional side view of apparatus for manufacturing a cup, in a first stage of manufacture.

Referring to the drawings, the apparatus shown therein is a development of that shown in U.S. Pat. No. 3,602,946 (British Patent No. 1,230,282), but other thermoforming or blow-molding apparatus could be used. The apparatus comprises a transfer ring 1, which is divided into two coaxial parts 2 and 3. When assembled, the parts 2 and 3 define a groove 4 extending around the periphery of the hole in the ring 1. In a previous step (not shown), a disc 5 of a moldable plastics material is formed within the ring 1 and flattened outwardly so that the outer edges of the disc 5 extend into the groove 4, whereby the disc is held in the transfer ring 1. The disc is then transported to the position shown in FIGS. 1–3, while still in the hot, moldable state.

The ring 1 rests on a mold 6 which has a mold cavity 7 that is substantially frustoconical in shape. The bottom of the mold is closed by a piston 8 which is slidable in a cylindrical bore in the mold 6.

Above the mold is supported a cover 9 which is axially movable into a position closing the top of the mold cavity 7. Secured to the lower face of the cover is a punch 10, shaped so as to assist the thermoforming of a cup with as uniform a wall thickness as possible.

Figure 2:
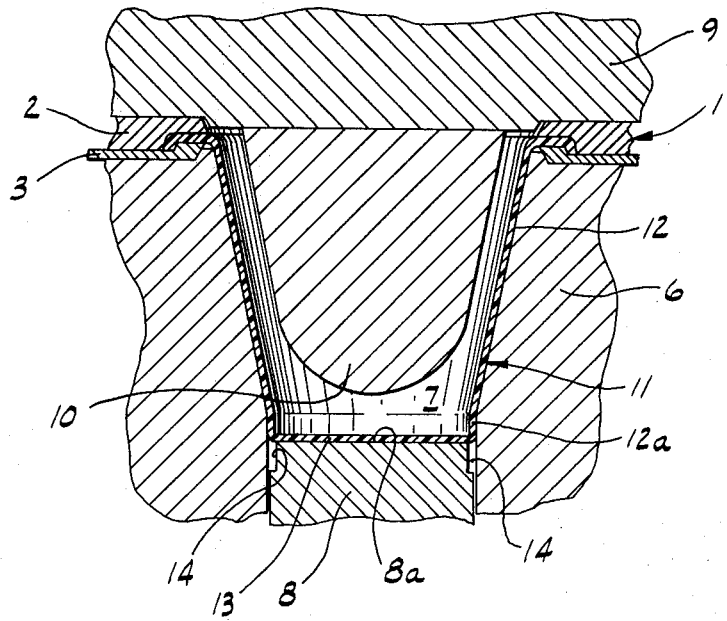
FIG. 2 is a side sectional view of the apparatus shown in FIG. 1, in a second stage of manufacture.
Figure 3:
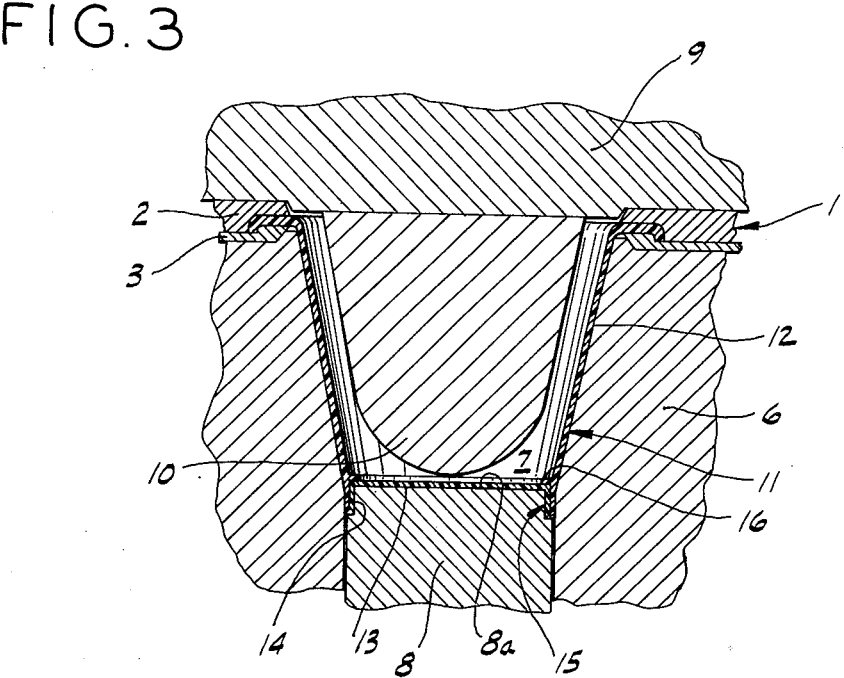
FIG. 3 is a sectional side view of the apparatus of FIGS. 1 and 2, in a third stage of manufacture.

In the first stage of manufacture of the cup, the cover 9 and the attached punch 10 are lowered toward the mold 6, until the lower face of the cover 9 abuts against the upper face of the ring 1. The space above the disc 5 is now closed. Compressed air is introduced into that space, and the space beneath the disc 5 is evacuated, in accordance with well-known principles of thermoforming or blow-molding. The disc 5 is thus formed into the walls of the mold cavity 7, to form a cup 11 as illustrated in FIG. 2.

The cup comprises a side wall or body 12 which is frustoconical over most of its surface, but which has a small cylindrical portion 12a at its lower end, and an integral base or bottom 13 formed on the upper end face 8a of the piston 8.

Figure 4:
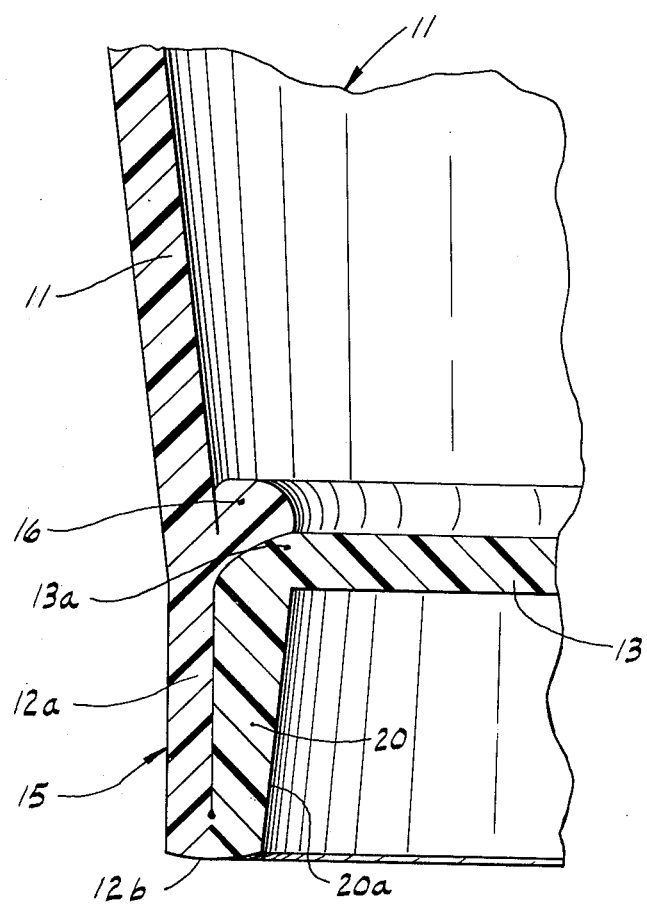
FIG. 4 is a sectional view of part of a completed cup.

The piston 8 has a circumferential groove 14 about its upper end face. The groove is slightly narrower than twice the thickness of the material of the cup walls. The depth of the groove decreases slightly away from the upper face of the piston 8 (i.e., the groove is tapered, having its depth decreasing in the direction away from its end face 8a). From the molding position shown in FIg. 2, the piston 8 is moved upwardly into the position shown in FIG. 3. During this movement, the base or bottom 13 is displaced upwardly, and material is folded from the bottom of the cylindrical portion 12a of the side wall 12, in order to form a folded peripheral bottom wall portion 15. This portion consists of lower portion 12a of the body of the cup and the folded-up flange 20 integral with the raised base or bottom 13 and the body of the cup joining the bottom edge 12b of the body and the periphery 13a of the raised bottom 13. Some material may also be drawn from the base 13, which becomes a raised bottom for the cup. The two layers 12a and 20 of the peripheral bottom wall portion 15 are welded and sealed together by the combined action of friction caused by relative axial movement and by the radical pressure exerted by the face of the groove 14. The radial pressure increases toward the lower edge of the wall, due to the decrease in depth of the groove. During the upward movement of the piston 8, due to the fact that the groove 14 is slightly less deep than the combined thickness of two layers of material, an integral bead 16 of the excess material may be formed around the juncture of the side wall 12 and base or bottom 13, extending inwardly from the side wall or body of the cup overlying the margin 13a of the raised base or bottom 13. This bead strengthens the cup and also covers the inner corner of the cup. This bead 16 is more easily visible in FIG. 4, which is an enlarged view of the bottom wall portion of the cup. Reference to FIG. 4 will also show the effect of the decreasing depth of the groove 14, which is to angle the inner face of the bottom wall 15 (i.e., the inner face 20a of flange 20). This angle aids extraction of the finished cup.

The finished cup 11 is then removed from the apparatus by lifting the cover 9 and the transfer ring 1 away from the mold 6, and separating the halves 2 and 3 of the transfer ring 1, the cup then being removable from between the two halves.

The cup described is both stronger in construction than the first-mentioned known cup, because the layers 12a and 20 of the peripheral bottom wall portion 15 are welded together instead of being spaced, and is also more hygenic than that known cup because no space exists for contamination. The cup is also simpler and cheaper to make than the second-mentioned known cup, because the procedure is a one-step operation involving no assembly of separate parts.

As various changes could be made in the above methods without departing from the scope of the invention, it is intended that all matter contained in the above description or shown in the accompanying drawings shall be interpreted as illustrative and not in a limiting sense.

What is claimed is:

1. The method of making a plastic container with a raised bottom, comprising molding the container with a body and a bottom integral with the body at the bottom edge of the latter, and displacing the bottom inwardly within the body to a raised position relative to the bottom edge of the body, and, in conjunction with said displacement, forming an inwardly folded flange integral with the bottom and the body joining the bottom edge of the body and the periphery of the raised bottom, and pressing said flange laterally outwardly against the surrounding lower portion of said body, sealing the flange to said lower portion via the combined action of friction caused by relative axial movement and by lateral pressure during said displacement, and causing flow of excess plastic to form a bead extending inwardly from the body of the container overlying the margin of said raised bottom.

* * * * *